June 17, 1952     F. BERTEIN     2,600,463
METHOD FOR CORRECTING ELECTRONIC OPTICAL SYSTEMS
Filed Dec. 24, 1948     2 SHEETS—SHEET 1

INVENTOR
FRANCOIS BERTEIN
By John B. Brady
ATTORNEY

June 17, 1952  F. BERTEIN  2,600,463
METHOD FOR CORRECTING ELECTRONIC OPTICAL SYSTEMS
Filed Dec. 24, 1948  2 SHEETS—SHEET 2
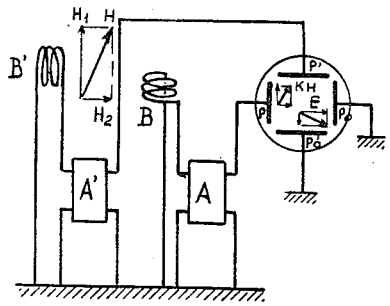
Fig:5
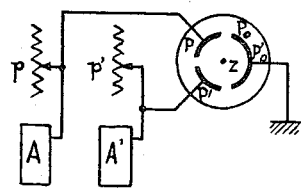
Fig:6
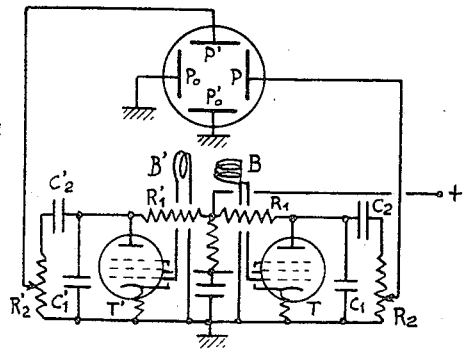
Fig:7  Fig:8
INVENTOR
FRANCOIS BERTEIN
By John C. Brady
ATTORNEY Patented June 17, 1952

2,600,463

UNITED STATES PATENT OFFICE 2,600,463

METHOD FOR CORRECTING ELECTRONIC OPTICAL SYSTEMS

François Bertein, Paris, France, assignor to Compagnie Generale de Telegraphie Sans Fil, a corporation of France Application December 24, 1948, Serial No. 67,195
In France January 26, 1948

1 Claim. (Cl. 315—8)

In copending patent application U. S. Ser. No. 12,228 for "Method of and Apparatus for Correcting Electron Optical Systems" filed on March 1, 1948, now Patent No. 2,547,994, I disclosed a method for correcting the trajectories of the electron or ion beam, in electronic optical instruments, which comprises arranging about the beam, outside the lenses, a system of electrodes adapted to be supplied with voltages of suitable value or a system of coils adapted to be supplied with excitation currents of suitably chosen strength.

The present application relates to a number of devices that enable, on the one hand the ellipticity astigmatism of the beam to be more efficiently corrected, and on the other hand the effect of stray alternating current fields on the beam to be neutralized.

Figure 1:
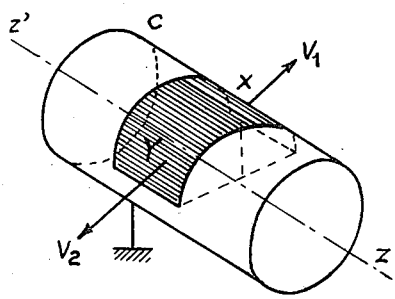
Figure 2:
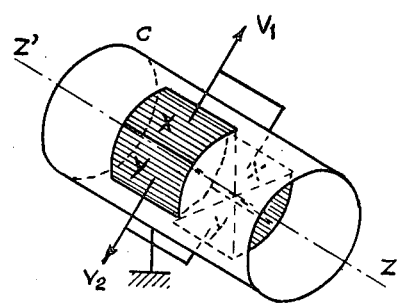
Figure 3:
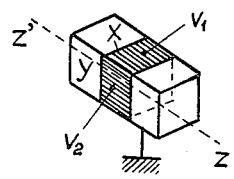

Figures 1, 2 and 3 show three convenient embodiments of a system of electrodes enabling the astigmatism of the beam to be corrected, according to the first object of this invention.

Figs. 4, 5, 6, 7 and 8 relate to circuit diagrams of a device for enabling the effect of stray fields on the beam to be neutralized, according to the second object of my invention.

It is to be understood that all these embodiments are indicated by way of a non-limitative example and for the sole purpose of enabling the invention to be understood more clearly.

A first object of the present invention relates to devices for correcting the astigmatism of the beam.

In a first embodiment (Fig. 1), the correcting device comprises two electrodes X, Y, arranged in a metal cylinder of revolution C, the axis of which coincides with the axis $z'z$ of the instrument, said two electrodes are two rectangular portions of C, each having an angular opening equal to 90° about $z'z$; they are juxtaposed and are respectively raised to suitable potentials $V_1$ and $V_2$, whereas the remainder of the cylinder is grounded.

In a second embodiment (Fig. 2), which is more efficient than the previous one, each of the electrodes X, Y comprises two rectangular portions cut out as hereinbefore in a metal cylinder of revolution C, the axis of which is $z'z$, and having an angular opening equal to 45° about said axis; the two portions X are both raised to a potential $V_1$ and the two portions Y to a potential $V_2$, whereas the remainder of the cylinder is again grounded.

It is moreover not essential for the electrodes X, Y to be curved. In a third embodiment, a square based prism (or cylinder) C is provided for example (Fig. 3), the axis of symmetry of which is $z'z$ and on the faces of which are cut out the rectangular electrodes X and Y which, as in the previous cases, are raised to potentials $V_1$ and $V_2$ respectively.

The correcting system such as has just been described is arranged in the actual body of the electronic optical instrument, along the axis of said instrument, preferably after the objective and after the diaphragm and its centring device. It is fixed to the objective block by means of a muff-coupling which supports the cylinder of the corrector by means of an insulating support, made of a transparent plastic for example.

It should be noted that the foregoing devices apart from correcting the astigmatism of the beam, also enable, by suitably dimensioning the positioning the electrodes, other faults to be corrected which are due to the fact that the electron beam is badly aligned along the axis owing, for example, to a wrong direction initially imparted to the gun or a diaphragm which is out of center, or incorrectly centered electron lenses.

A second object of the present invention relates to the neutralization of the effect of stray alternating current fields in electronic optical instruments.

It is known that such stray fields, which are of a magnetic nature, are produced by sources of supply which are located nearby and are insufficiently screened. They exert forces on the electron trajectories that impart a vibration thereto, so that the impacts of said trajectories on the final observation screen are not absolutely stationary. Thus, if the spot of an insufficiently protected oscillograph is examined, a certain movement along a small segment or an ellipse can ofen be observed, even with the naked eye.

In the case of the electron microscope, the elimination of such a mobility of the spot is more essential as the greater magnification of the instrument tends to amplify it, which has the effect of decreasing the separating power of the microscope.

It has been shown, moreover, that the sensitive portion of the trajectories in the electron microscope is located between the objective and the projection lens, and said portion is protected in general by surrounding it with a tube of high magnetic permeability metal; but the screening effect thus obtained is never complete.

The devices which are the subject of the present invention are intended for protecting an electronic or ionic optical instrument from any stray alternating current field. This protection may be exerted with respect to a predetermined frequency (that of the electric supply system for example) or with respect to a range of low frequencies. It acts by correcting the disturbance due to the stray field, the correction being based on the production, by the stray field itself, of an electric field of the same periodicity, which is proportional to the stray field and which exerts on the electron or ion beam an effect that exactly compensates the effect of the stray field.

According to the diagram of Fig. 4, which corresponds to the case of a vertical alternating current stray field, the mechanism of this compensation, in the electron microscope, is as follows:

A coil B with a horizontal winding is arranged near the microscope, the objective of which is $L_1$, the projection lens of which is $L_2$, and the axis $z'z$ of which is assumed to be horizontal; the stray field H which tends to disturb the operation of the instrument, induces in B an alternating current voltage $u$ which is transformed into a voltage of the same periodicity $v$ by means of a suitable amplifying system which is diagrammatically represented in the figure by the parallelepiped block A.

On the other hand, in the microscope itself, on either side of the beam and preferably at the outlet of the objective $L_1$, are arranged two plates $P_0$ and P of the type of those of the deflecting systems of cathode ray oscillographs; $P_0$ is grounded, whereas the voltage $v$ is applied to P.

An electric field E is thus set up in the space between $P_0$ and P, which exerts the required compensating action on the beam provided that E is horizontal, that is to say that the plates $P_0$ and P are vertical; that the variation of E is in phase with that of H, that is to say that the voltage $v$ is in phase quadrature with $u$; finally that the various elements of the system are so chosen that the following equation exists between the various parameters:

(1) $$NS = 10^5 K \frac{V}{\omega} \frac{De}{1} \frac{1}{G} \text{(in centimetre-volts)}$$

wherein:

N is the number and S the area of the convolutions of the coil B;

K is the coefficient of screening of the tube surrounding the beam;

V, the acceleration voltage of the electrons;

$\omega$, the frequency of the stray field H (to an approximation of $2\pi$);

$e$, the distance between, and 1 the length of, the plates $P_0$, P;

D, the distance between the objective and the projection lens of the microscope;

G, the voltage gain of the circuit A.

If the periodically variable field H is not sinusoidal, in order that the compensation shall be more correctly effected, it is necessary for the three above conditions to be satisfied for each of the component frequencies of H. This involves a circuit A such that, in the range of the frequencies considered, the difference of phase between the output voltage and the input voltage is constantly 90° and the voltage gain varies as $$\frac{1}{\omega}$$

It is possible to see that these two conditions are not only compatible, but also follow from one another.

In the general case, the stray field varies in any manner in periodicity and in direction, but the disturbing effect is solely produced by its transverse component, i. e. its component which is at right angles to the axis of the instrument. If said transverse component is still designated by H, its disturbing action can be expressed by KH, K being a coefficient which is generally of the order of $$\frac{1}{500}$$

Figure 4:
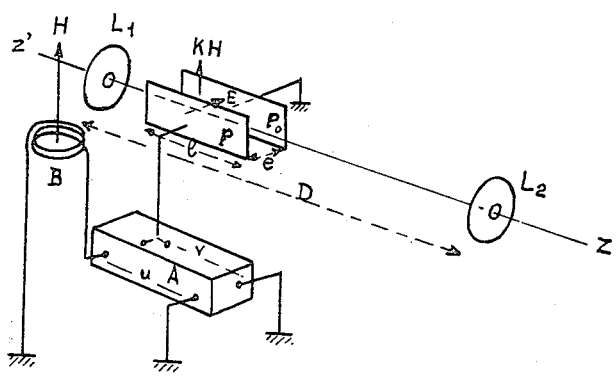

The diagrammatic device of Fig. 4 effects the compensation of the vertical component $H_1$ of H; the compensation of its horizontal component $H_2$ can be obtained by means of a similar device, but turned 90° about the axis $z'z$ of the instrument, as shown in Fig. 5.

In the general arrangement diagram of said Fig. 5, the transverse component H of the disturbing field is at each instant the resultant of the vertical field $H_1$ and the horizontal field $H_2$. The coil B, which is at right angles to $H_1$, supplies the compensating voltage for $H_1$ to the pair of plates $P_0$, P by means of the circuit A; similarly, the coil B', which is at right angles to $H_2$, supplies the compensating voltage for $H_2$ to the pair of plates $P'_0$, P' by means of the circuit A' which is similar to A.

The foregoing device effects a suitable compensation of the stray field in the case in which, in the sensitive region of the microscope, said stray field is sufficiently uniform. In the moreover exceptional case in which the stray field is not uniform, it would still be possible to obtain a suitable compensation by dividing each coil into fractions and by arranging the various elements along the tube of the instrument in such a manner as to collect a mean value of the disturbing field; furthermore, the sounding thus arranged should be more particularly effected adjacent the objective, since that is the point where the most sensitive zone for the beam is located.

Of course, the scope of the invention would not be exceeded if, instead of using particular electrodes $P_0$, P and $P'_0$, P', the electrodes that already exist in the instrument were used; in particular, this solution would decrease the number of additional voltage leads in the vacuum chamber. Moreover, it is not necessary for the compensating electrodes to be parallel plates; it is always possible to use for this purpose the various adjusting or correcting electrodes contained in the instrument, the natural function of such electrodes being in no way modified by the additional part they are made to play.

In this respect, Fig. 6 gives an example of a compensating device according to the invention, wherein the plates are replaced by the electrodes of a cylindrical system about the axis $z'z$ of the instrument; $p$ and $p'$ are the potentiometers which effect the pre-existing adjustment of the electrode system. It should be noted that, in an embodiment of this kind, the outputs of the circuits A and A' are no longer connected across an infinite impedance, and it is necessary to take this into account in the conditions of compensation.

Finally, by way of non-limitative examples, two embodiments are given of the circuits A and A' and are respectively shown diagrammatically in Figs. 7 and 8.

In the example of Fig. 7, condensers C and C' form, with the coils B and B' respectively, resonant circuits which are tuned to the frequency of the stray field to be eliminated. In this case, it is in general necessary to insert magnetic cores in the coils in order to enable the conditions of resonance to be obtained conveniently. The compensation is only effected for the resonance frequency, for example the industrial frequency of 60 cycles.

In the example of Fig. 8, each of the circuits A and A' which charge the pairs of electrodes P, $P_0$ and P', $P'_0$, is provided with an amplifying valve. In the circuit A of the coil B, the resistances $R_1$, $R_2$, the capacities $C_1$, $C_2$, and also the internal resistance and the coefficient of amplification of the tube T, must be so chosen that the Equation 1 hereinbefore given is satisfied, for example for all the disturbing low frequencies. The elements $R'_1$, $R'_2$, $C'_1$, $C'_2$ and T' of the circuit B' must be chosen in the same manner.

The foregoing arrangement requires a careful filtering of the anode supply voltage, if the same is supplied by a rectifier; otherwise there would be an alternating fluctuation that would be transmitted to the plate P, $P_0$ or P', $P'_0$ at the same time as the correcting voltage and would impair the compensating effect thereof. The system ($C_1$, $R_1$) or ($C'_1$, $R'_1$) moreover contributes to such a filtering.

The adjustment of the compensating system is effected in an extremely simple manner: a sufficiently intense alternating current field is set up near the microscope to produce an aberration which can be clearly discerned by the eye; the potentiometers $R_2$, $R'_2$ can then readily be adjusted to eliminate the optical fault. The compensation does not depend on the intensity of the fields and is consequently effected ipso facto for any stray fields.

Finally, the scope of the invention will not be exceeded if, as hereinbefore stated, magnetic compensating members, such as deflecting coils associated or not with magnetic cores, are used instead of deflecting plates.

What I claim is:

In an electronic optical instrument comprising an envelope enclosing an electron beam, means for focussing the said beam, an electrode system for correcting the effect of stray alternating current fields on said beam, said system being formed of two pairs of deflecting plates, the plates of one of said pairs being substantially parallel to each other, and substantially perpendicular to the plates of the other pair of plates, the said plates being arranged symmetrically around the said beam inside the envelope of said instrument, two coils whose axis are substantially perpendicular to each other arranged in the vicinity of said beam and located outside of the envelope of said instrument, means for amplifying the voltages induced in said coils by the stray alternating current fields, means for feeding the amplified voltage of one of said coils to one of said pairs of deflecting plates, and means for feeding the amplified voltage of the other coil to the other pair of plates.

FRANÇOIS BERTEIN.

REFERENCES CITED

The following references are of record in the file of this patent:

UNITED STATES PATENTS

| Number | Name | Date |
| --- | --- | --- |
| 2,075,142 | Schlesinger | Mar. 30, 1937 |
| 2,197,523 | Gabor | Apr. 16, 1940 |
| 2,212,640 | Hogan | Aug. 27, 1940 |
| 2,214,729 | Hickok | Sept. 17, 1940 |
| 2,489,330 | Selgin | Nov. 29, 1949 |